No. 724,612. PATENTED APR. 7, 1903.
A. A. PRATT.
GAS BURNER AND REGULATOR FOR SAME.
APPLICATION FILED MAR. 15, 1902.
NO MODEL.
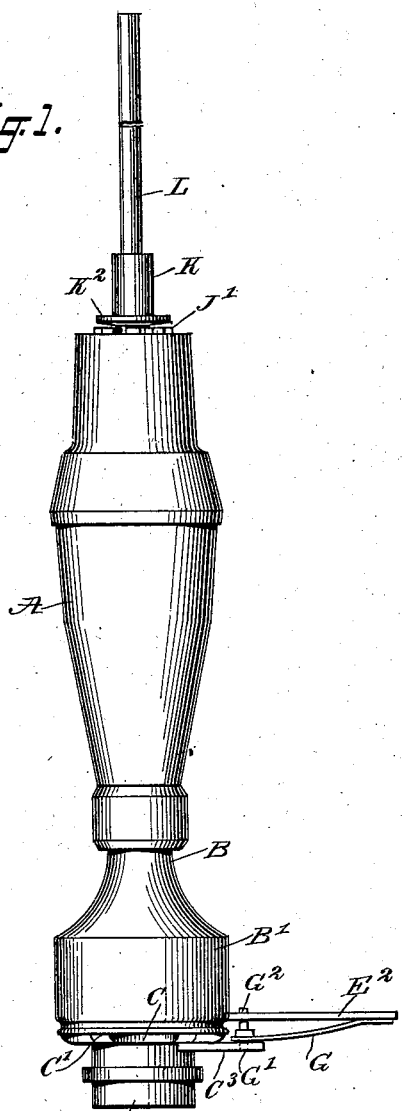
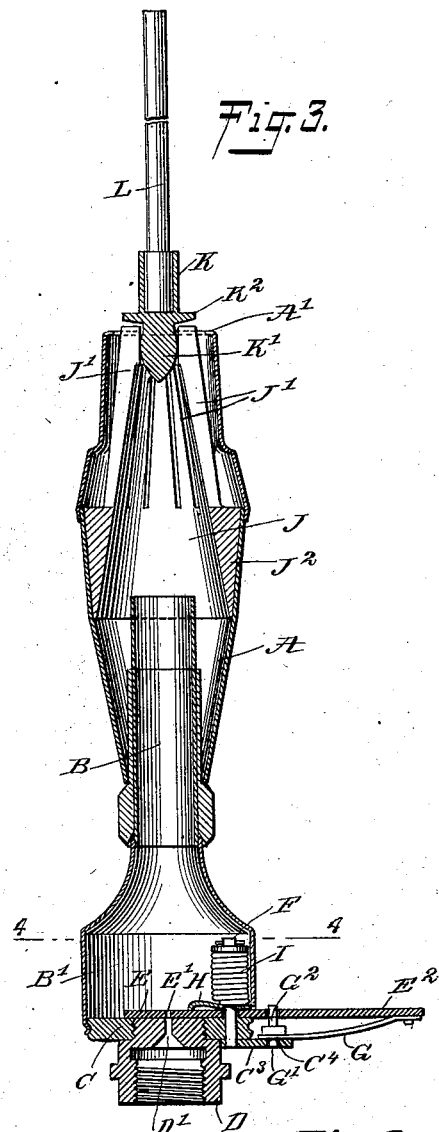
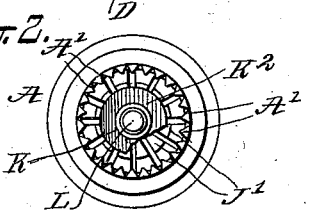
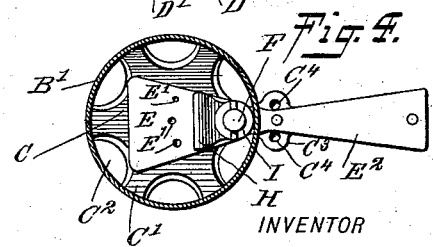
WITNESSES:
William P. Goebel.
Theo. G. Hoster.
INVENTOR
Allison A. Pratt
BY
ATTORNEYS

UNITED STATES PATENT OFFICE.

ALLISON A. PRATT, OF NEW YORK, N. Y., ASSIGNOR TO FRANCIS D. WARNER, OF NEWCASTLE, INDIANA.

GAS-BURNER AND REGULATOR FOR SAME.

SPECIFICATION forming part of Letters Patent No. 724,612, dated April 7, 1903.

Application filed March 15, 1902. Serial No. 98,325. (No model.)

*To all whom it may concern:*

Be it known that I, ALLISON A. PRATT, a citizen of the United States, and a resident of the city of New York, borough of Manhattan, in the county and State of New York, have invented a new and Improved Gas-Burner and Regulator for the Same, of which the following is a full, clear, and exact description.
The invention relates to incandescent gas-burners, such as shown and described in Letters Patent No. 703,083, granted to me June 24, 1902.

The object of the present invention is to provide a new and improved gas-burner and regulator for the same arranged to allow minute regulation of the amount of gas passing into the mixing-chamber of the burner to insure a proper mixture and burning of the gas and air for producing a very bright light without waste of gas and irrespective of the prevailing pressure of the gas-supply.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a plan view of the same with parts broken out. Fig. 3 is a sectional side elevation of the same, and Fig. 4 is a sectional plan view of the same on the line 4 4 of Fig. 3.

Into the shell A of the gas-burner opens the conductor B, provided at its lower end with an air and gas primary mixing-chamber B', carrying at its bottom a ring C by means of radial arms C', secured to the lower end of the said chamber B', as plainly indicated in Figs. 1, 3, and 4. The arms C' form, with the ring C and the wall of the chamber B', inlet-openings $C^2$ for the passage of the air into the mixing-chamber B'. In the ring C screws a gas-inlet D, having its lower portion threaded to screw upon the gas-supply pipe, and the upper portion of the said gas-inlet is formed with a central jet-opening D', adapted to register with one of a series of spaced and graduated openings E', formed in a valve E, movably held on the top of the gas-inlet D, the said top forming a valve-seat for the valve E to move on. The openings E' are of different sizes, the largest one being approximately of the same size as the jet-opening D' to allow of regulating the amount of gas passing from the supply-pipe through the gas-inlet through said registering-openings into the mixing-chamber B', according to the pressure of the gas prevailing at the time—that is, if the pressure is very high the valve E is shifted so as to bring the smallest opening E' in register with the jet-opening D', and if the gas-pressure is less high the valve is shifted to the next largest or middle opening E', and in case the gas-pressure is normal then the valve E is shifted to bring the largest opening E' in register with the jet-opening D'.

The valve E is mounted to swing on a pivot F, secured in one of the arms C', and the said valve is formed with an outward extension $E^2$, which forms a handle adapted to be taken hold of by the operator to impart a swinging motion to the said valve, so as to bring the desired opening E' in register with the jet-opening D', it being understood that the openings E' are arranged in a circle the center of which coincides with the center of the pivot F.

In order to lock the valve E in position after the desired adjustment is made, I provide the extension $E^2$ with a spring G, carrying at its free end a pin G', adapted to engage one of a series of apertures $C^4$, formed in a bracket $C^3$, secured to or forming part of the arms C'. The pin G' depends from the spring G and is provided with an upward extension $G^2$, loosely fitting an opening in the extension $E^2$, so as to guide the spring G when pressed and released, it being understood that in order to move the valve E it is necessary for the operator to first press the spring G to disengage the pin G' from the aperture $C^4$ to then move the extension sidewise for turning the valve until the desired opening E' registers with the jet-opening D'. When this takes place, the pin G' is in register with one of the apertures $C^4$, and when the operator releases the pressure on the spring G then the latter moves the pin G' in engagement with the registering aperture C⁴.

In order to hold the valve E firmly to its seat on the gas-inlet D to avoid leakage between the seat and the inside of the valve, I provide a pressure-plate H, held on the pivot F and extending onto the top of the valve E, adjacent to the openings E', the said pressure-plate being pressed on by a spring I, coiled on the pivot F.

The shell A and conductor B, previously referred to, are similar to the ones described in the patent above referred to, and in the said shell extends a mixing and pressure chamber J, likewise similar in construction to the corresponding part in the said patent—that is, the mixing and pressure chamber J is provided with spaced prongs J', rising from the base J², and the upper ends of the said prongs engage the shank K' of a holder K, supporting a post L, employed for supporting the mantle of the gas-burner. On the holder K is formed an annular deflector K², curved or beveled on the under side, so as to deflect the gas rising between adjacent prongs J' in an outward direction, and the gas rising between the outer faces of the prongs J' to the inside of the upper portion of the shell A is deflected inwardly by a serrated flange A', extending inwardly from the upper end of the shell A. This serrated flange is somewhat below the top surfaces of the prongs J' to cause the two streams of gas to meet, thereby insuring intimate mixture of the gases at the very point of ignition. Now it will be seen that as the air and gas are thoroughly mixed previous to igniting the same and as the gas-supply and burner can be regulated according to the prevailing pressure in the gas-main it is evident that a very bright light is obtained and no gas whatever is wasted.

Having thus described my invention, I claim as new and desire to secure by Letters Patent—

1. The combination with a burner provided with a valve-seat, a jet-opening in the seat, and an apertured bracket, of a spring-pressed valve movable on said seat and provided with graduated openings adapted to register with the jet-opening, and with a handle, and a spring having one end secured to the handle and provided at its free end with a pin for entering an aperture of said bracket, as set forth.

2. The combination with a burner provided with a valve-seat, a jet-opening in the valve-seat, and an apertured bracket, of a spring-pressed valve pivotally mounted on the said seat and provided with graduated openings adapted to register with the jet-opening, a spring having one end secured to the handle, and a pin carried by the free end of the spring and having guided movement in the handle, said pin entering an aperture of the bracket, as set forth.

3. The combination with a burner having a valve-seat, and a jet-opening in said seat, of a pivoted valve having graduated openings adapted to register with the jet-opening, and a spring-pressed pressure-plate extending over the top of said valve and engaging the same with its free end, as set forth.

4. The combination with a burner having a valve-seat, and a jet-opening in said seat, of a valve pivotally mounted on the seat and provided with graduated openings adapted to register with the jet-opening, a pressure-plate mounted on the pivot of the valve and extending over the top of the valve and engaging the same with its free end, and a spring coiled on the pivot of the valve and bearing upon said plate, as set forth.

5. An incandescent gas-burner having a shell formed at its upper end with an inwardly-extending serrated flange, a mixing and pressure chamber in the said shell, having spaced prongs forming slits for the passage of the mixture of air and gas, the top of the prongs being somewhat above the said flange, and a deflector above the prongs, as set forth.

6. An incandescent gas-burner having a shell formed at its upper end with an inwardly-extending serrated flange, a mixing and pressure chamber in the said shell, having spaced prongs forming slits for the passage of the mixture of air and gas, the top of the prongs being somewhat above the said flange, a deflector above the prongs, a mixing-chamber for the gas and air, provided with a conductor for conducting the mixture into the said mixing and pressure chamber, a gas-inlet for the said mixing-chamber, having a gas-jet opening, and a regulating-valve for regulating passage of gas through the jet-opening according to the pressure of the gas, as set forth.

7. In an incandescent gas-burner, a shell having its upper end provided with an inwardly-extending serrated flange, a mixing and pressure chamber in the shell and having spaced prongs forming slits for the passage of the mixture of air and gas, and mantle-holder with the shank of which the prongs of the mixing and pressure chamber engage, said holder being provided with a deflector, as set forth.

In testimony whereof I have signed my name to this specification in the presence of two subscribing witnesses.

ALLISON A. PRATT.

Witnesses:
  THEO. G. HOSTER,
  EVERARD BOLTON MARSHALL.